United States Patent [19]

Weeks

[11] Patent Number: 4,475,648

[45] Date of Patent: Oct. 9, 1984

[54] BELT CONVEYOR

[75] Inventor: Raymond L. Weeks, Oxford, Miss.

[73] Assignee: FMC Corporation, Chicago, Ill.

[21] Appl. No.: 328,154

[22] Filed: Dec. 7, 1981

[51] Int. Cl.³ .............................................. B65G 39/12
[52] U.S. Cl. ..................................... 198/830; 198/860
[58] Field of Search ....................... 198/830, 860, 828; 403/398, 399, 409

[56] References Cited

U.S. PATENT DOCUMENTS

| 2,128,309 | 8/1938 | Madeira | 198/860 |
| 3,356,206 | 2/1966 | Lantz | 198/828 |

FOREIGN PATENT DOCUMENTS

| 854966 | 11/1960 | United Kingdom | 198/830 |
| 1354670 | 5/1974 | United Kingdom | 198/828 |
| 1363839 | 8/1974 | United Kingdom | 198/860 |

*Primary Examiner*—Joseph E. Valenza
*Assistant Examiner*—Kyle E. Shane
*Attorney, Agent, or Firm*—R. B. Megley; D. W. Rudy

[57] ABSTRACT

A troughed belt conveyor has a roll supporting base beam with downwardly diverging flanges, one of which supports the bottom roll with the other supporting the angled side rolls. The side rolls are longitudinally offset from the bottom roll and the upper end portions of adjacent rolls are laterally overlapped. The frame structure units for the conveyor are joined by U-section wedges that slidably fit wedge-receiving apertures and which have outwardly bent wedge-retaining tabs.

4 Claims, 33 Drawing Figures

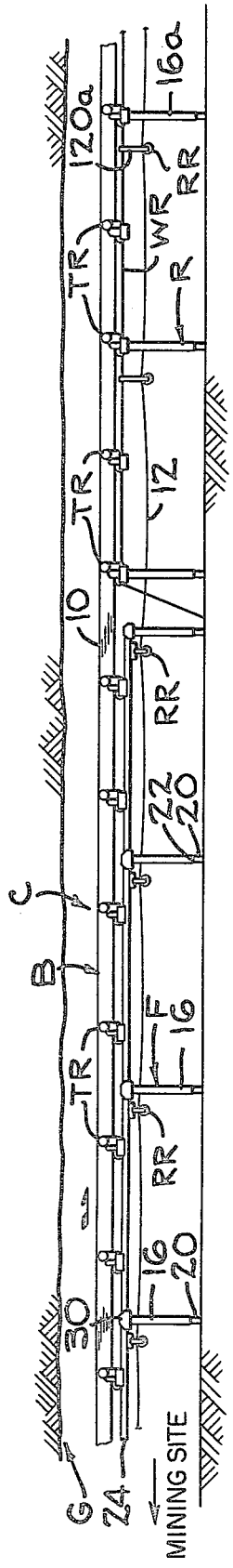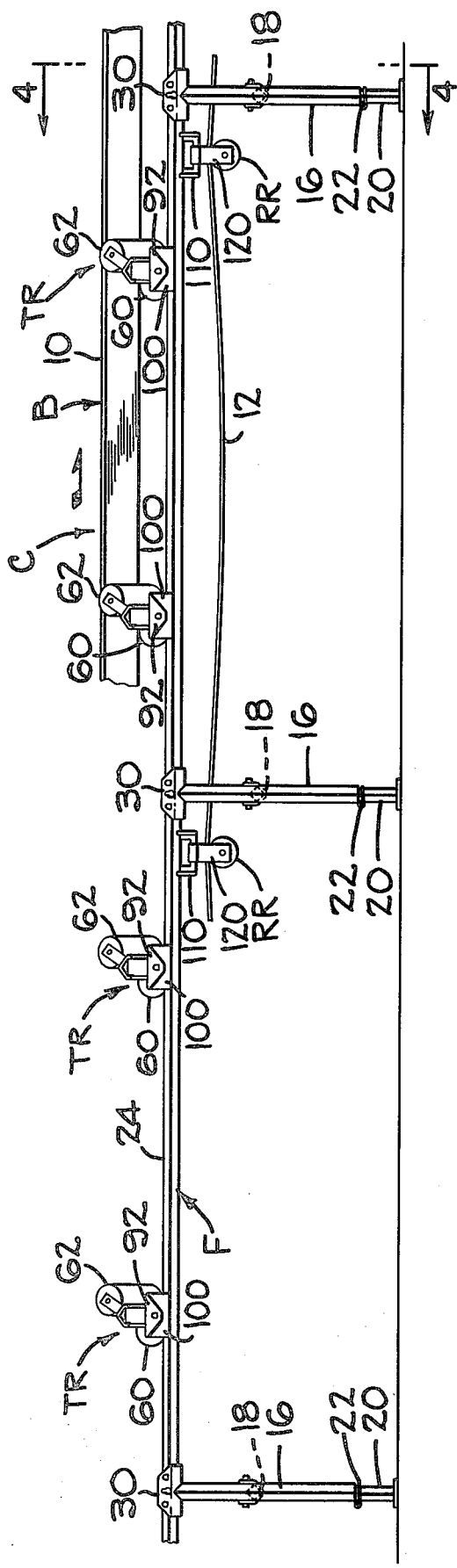

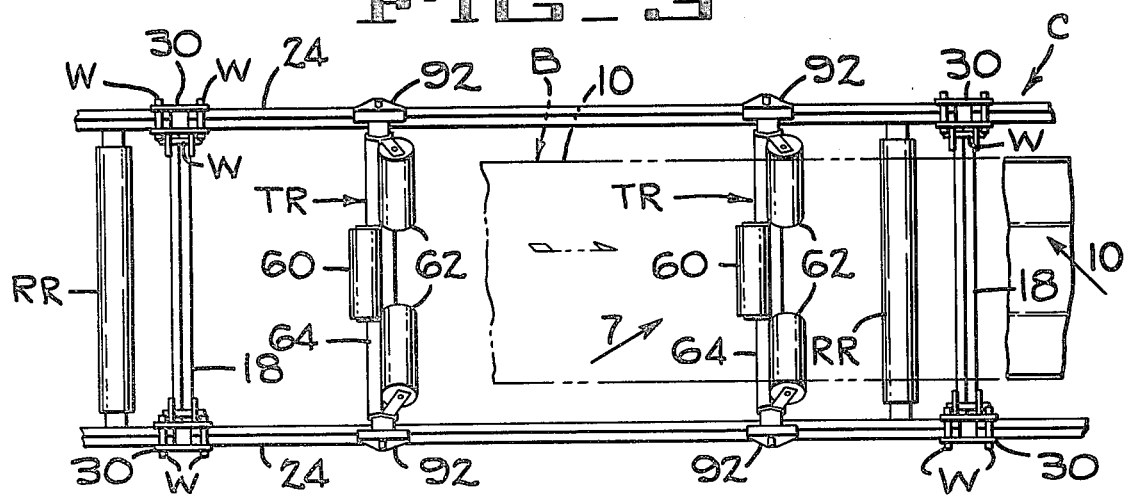
FIG_3
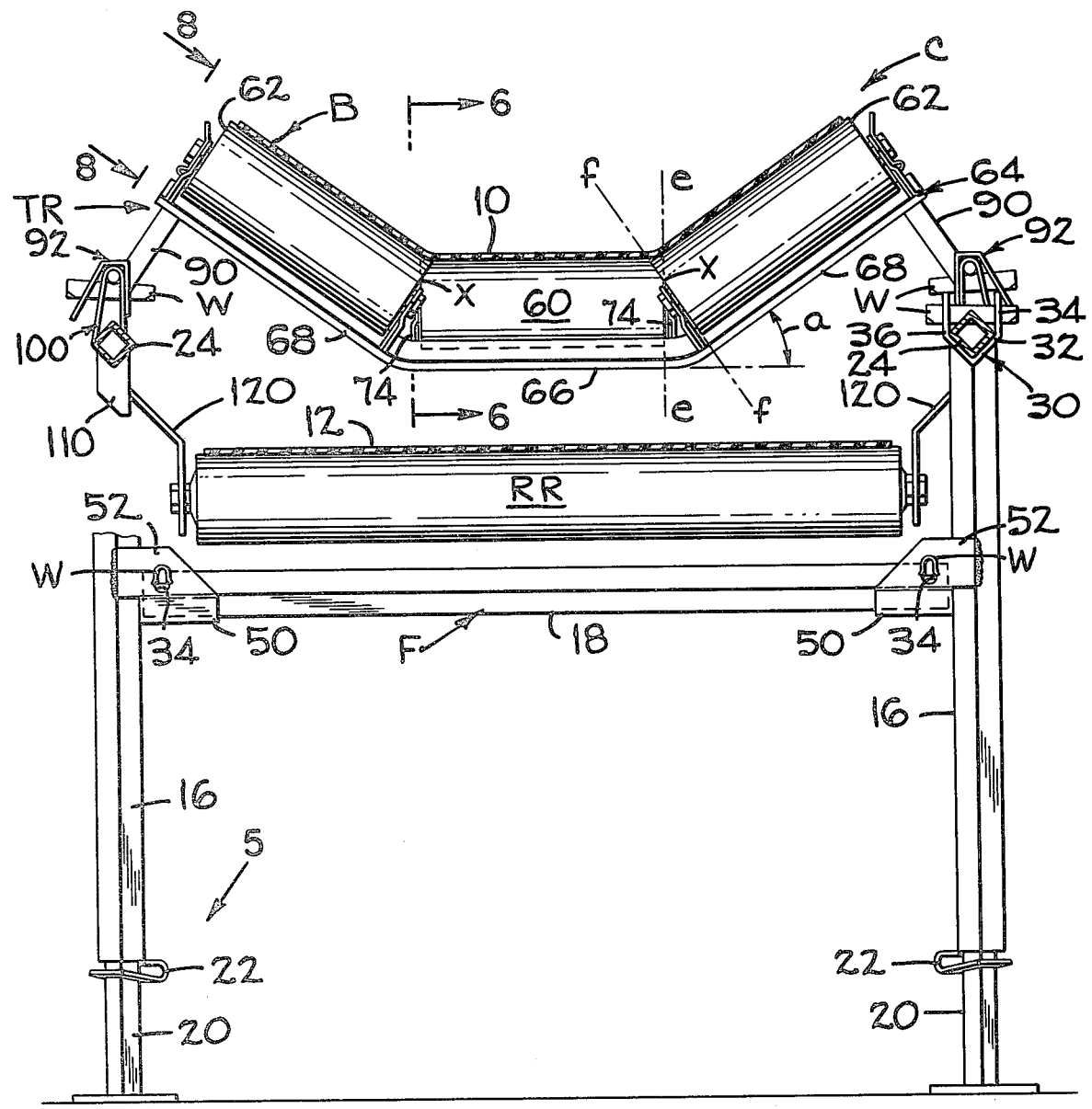
FIG_4

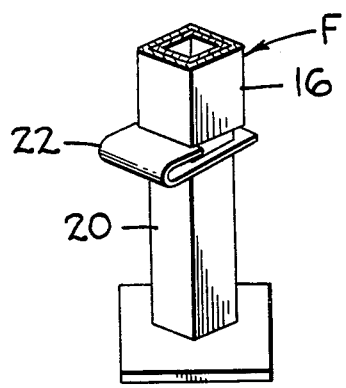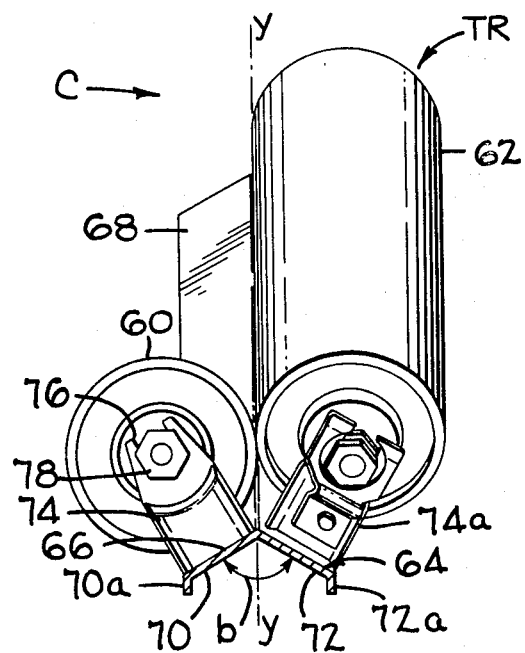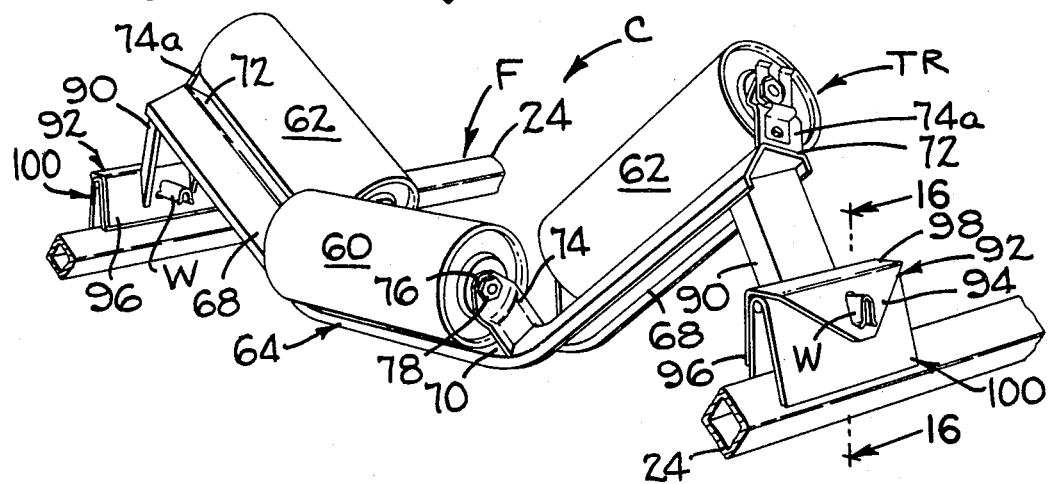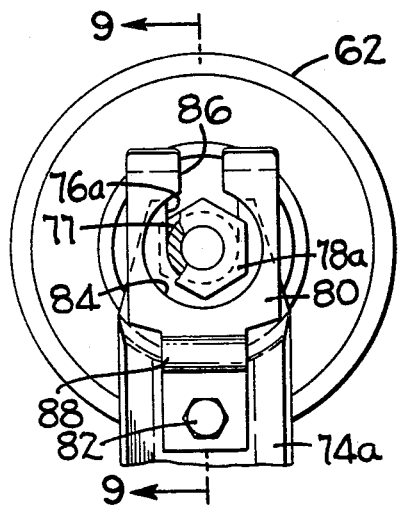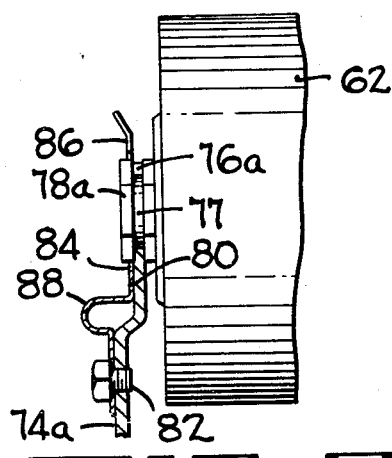

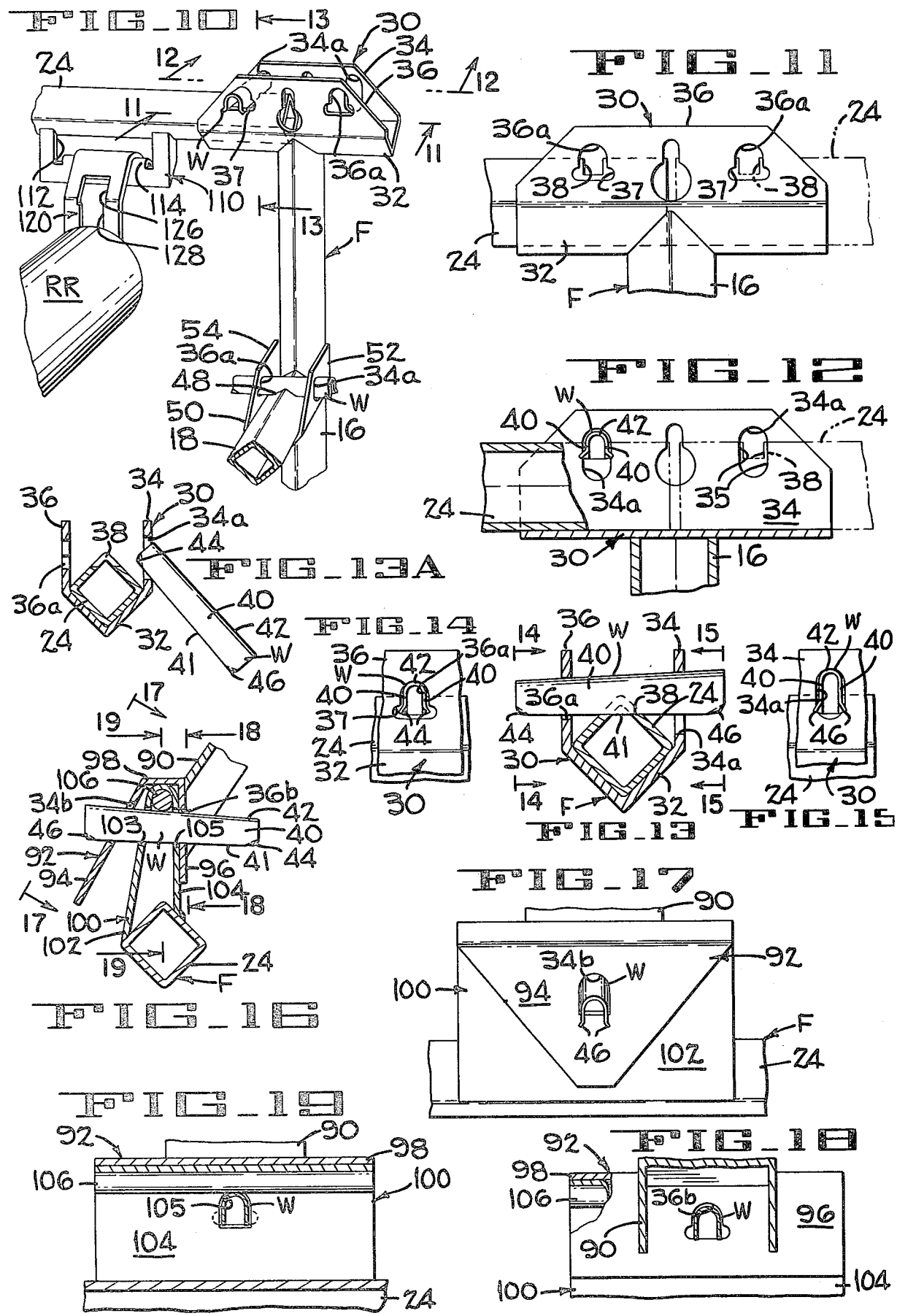

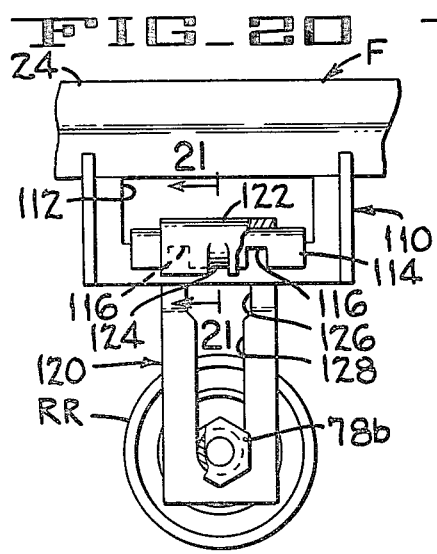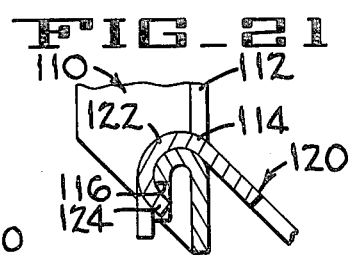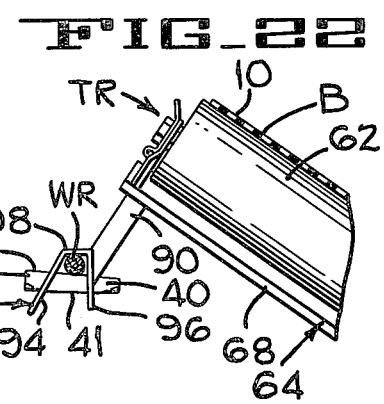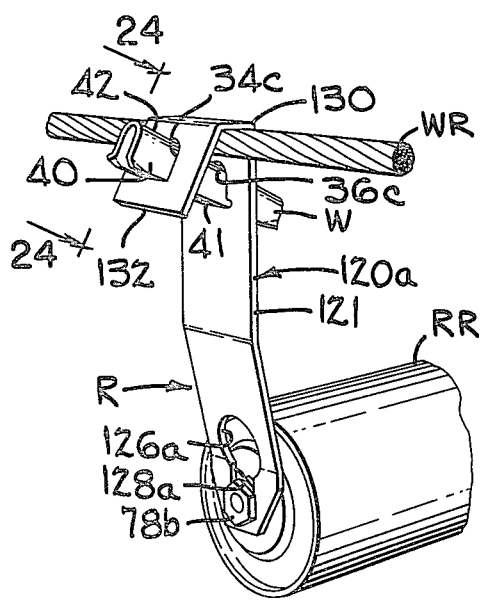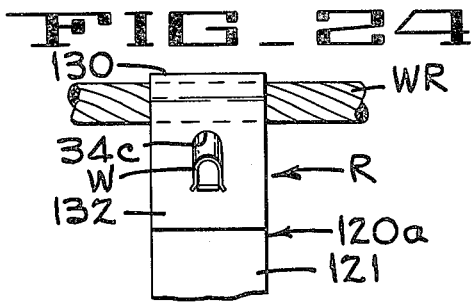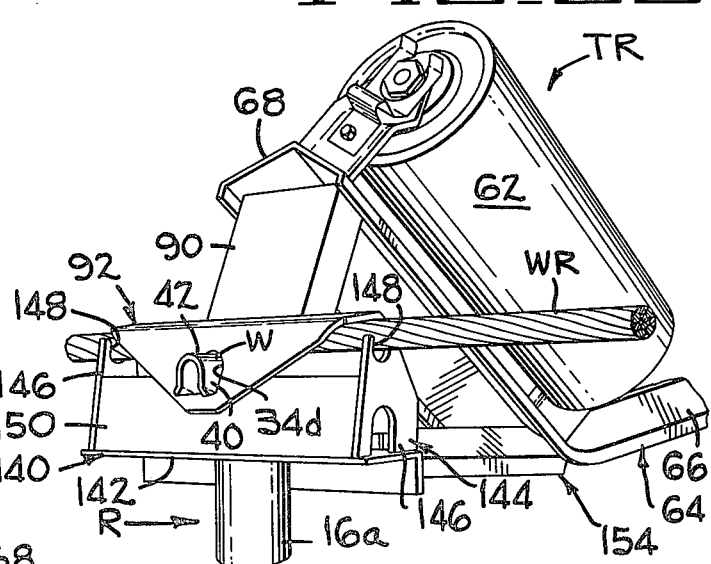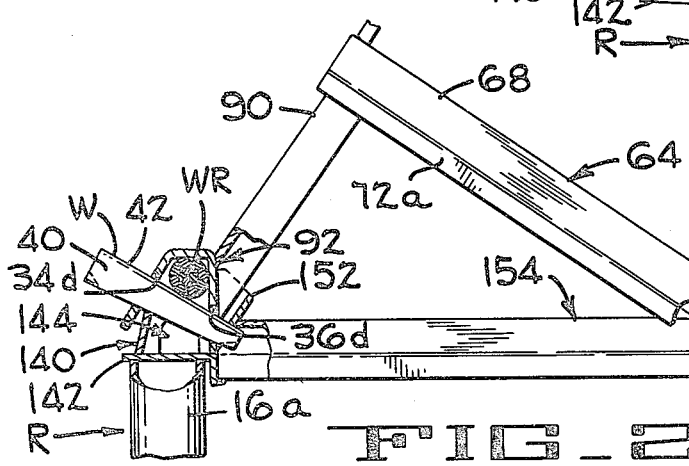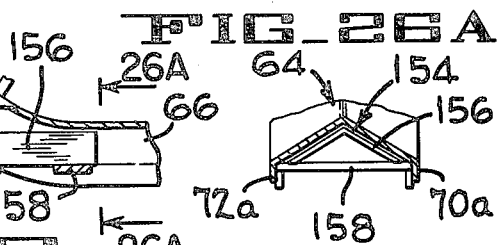

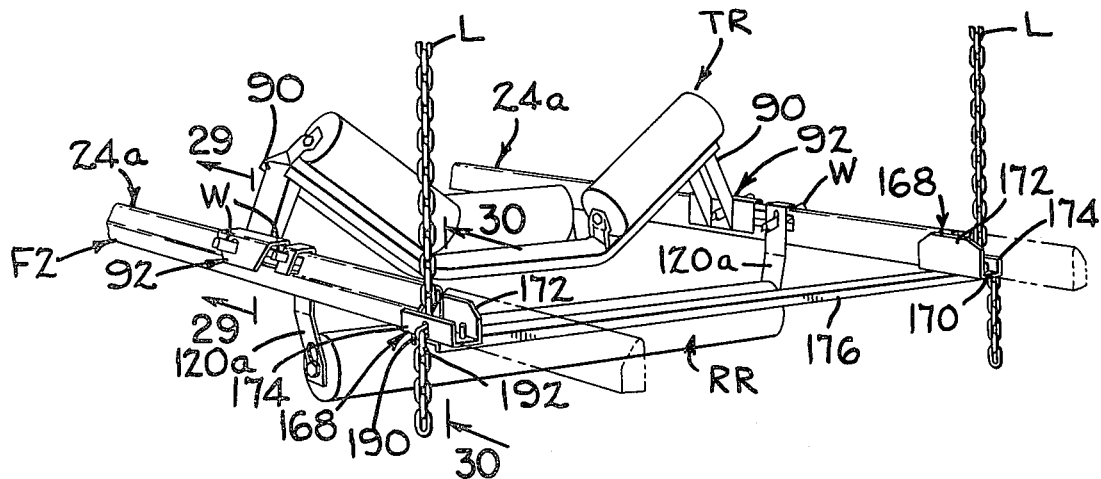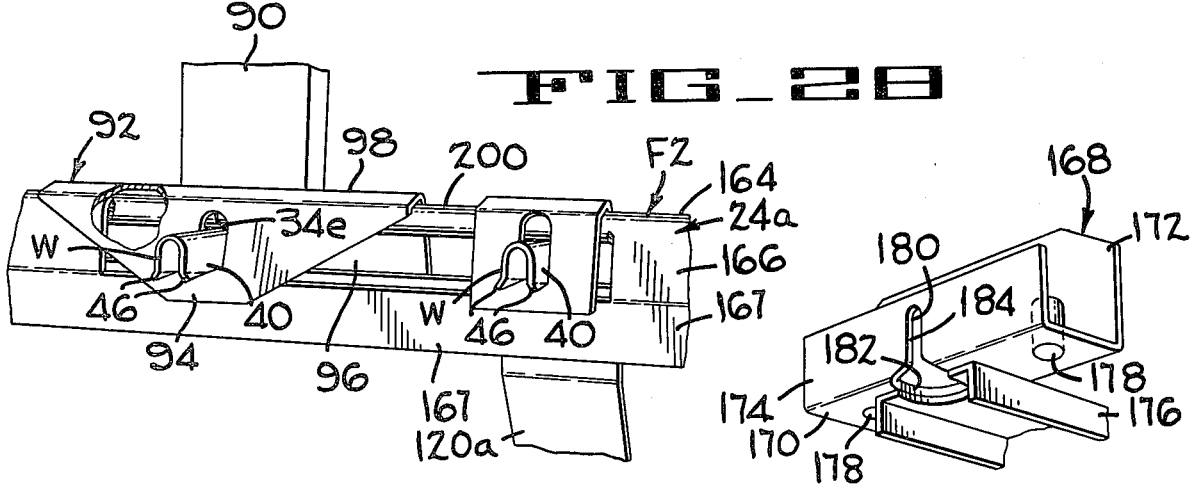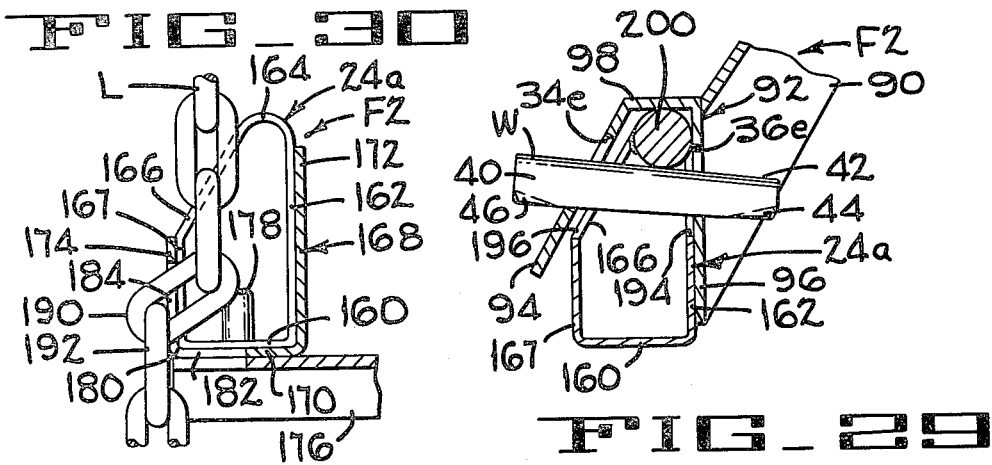

BELT CONVEYOR

BACKGROUND OF THE INVENTION

1. Field of the Invention

This invention relates to belt conveyors and more particularly to troughed belt conveyors including means for mounting and supporting the idler roll assemblies.

2. Description of the Prior Art

The "Stringerflex" cable stringer belt conveyor idlers previously manufactured by the Link Belt Company of Chicago, Ill. employed an angle iron base beam having an inverted 90° angle section that provided dependent, diverting roll-mounting flanges. The beam extended transversely of the conveyor belt. The beam had a horizontal reach for mounting a bottom idler roll on our flange and bent up end portions for mounting side idler rolls on the other flange. The adjacent upper end portions of the angled side rolls and the horizontal bottom roll were laterally overlapped.

If a vertical plane were passed through the apex of the base beam angle between the bottom and the side rolls, the opposed surfaces of the bottom and side rolls facing and nearest to such plane would be spaced from the plane.

Instead of mounting the idler roll beams on cables, they have been mounted on a frame assembly constructed from structural shapes, including horizontal rails for mounting the base beams. These rails have been formed as box-section beams mounted with their upper flat faces disposed horizontally. With this construction, when the conveyor runs through a mine gallery, the upper flat faces of the rails collected ribbons of dust and debris dislodged from the roofs of the mine gallery.

Prior frame assemblies have included not only the aforesaid horizontal rails but have also included rail support legs or posts and cross braces or spacing members. If the posts and cross braces must be assembled or connected before transport into a mine gallery as sub-assemblies, such sub-assemblies do not stack compactly for transport into the gallery.

The use of wedges to connect separate units of a conveyor is known. One type of prior wedge has a small flange at its large end from which project parallel, tapered wedge flanges, cantilever fashion. These flanges are not connected along their lengths but their free ends are deformed to provide laterally projecting wedge-retaining projections. The conveyor units that are joined by these prior wedges are provided with inner and outer wedge-receiving apertures. The outer apertures are rectangular and their side edges can closely fit the side flanges of the wedges. However, in order to clear the projections on the free ends of the wedges during assembly of the units to be connected, the side walls of the inner apertures are more widely spaced than are the side walls of the outer apertures, in order to clear the retainer projections on the inner ends of the wedges. Since the inner apertures do not precisely laterally confine the inner ends of the wedges after assembly and before the wedges are hammered home, the inner ends of these wedges can become laterally cocked before and during the hammering operation.

Lateral cocking of these prior wedges precludes precise wedging engagement between the upper and lower edges of both wedge flanges and the upper and lower edges of the wedge-receiving apertures in the connector units to be joined by the wedges. One of the wedge flanges tightens before the other flange because as a result of the aforesaid cocking of the entire wedge one flange extends a greater distance through the wedge-receiving apertures than does the other flange.

Another known prior wedge is formed as a tapered solid bar, having a generally oval cross section along its length.

SUMMARY OF THE INVENTION

In the troughed belt conveyor of the present invention, the angled side troughing rolls and the bottom roll or rolls are all mounted on a single transverse base beam. The adjacent upper portions of the side rolls laterally overlap the bottom roll, thereby providing a continuous belt supporting surface at the roll set. Looking along the direction of belt travel, there are no lateral gaps between the upper end portions of the bottom roll and the adjacent upper end portions of the side rolls.

In accordance with the present invention, the base beam has an inverted, generally V-shaped section from end to end. The beam has downwardly diverging flanges, which flanges form an obtuse angle with one another. The diverging flanges each provide a mounting base for upright roll-end mounting brackets welded to the flanges. The brackets for the bottom roll project from one base flange and the brackets for the side rolls project from the other base flange. All of the brackets are structurally alike, thereby reducing manufacturing inventory.

The obtuse angle between the base beam flanges is selected and the heights of the roll mounting end brackets are selected so that for a given roll diameter, sufficient longitudinal roll offset is provided so that the adjacent upper end portions of the rolls can overlap in a lateral direction for the purpose described.

Preferably, the parts are dimensioned and the base beam angle (preferably about 120 degrees) is selected so that the roll mounting end brackets can project normally from their respective base beam flanges. Preferably, the parts are also dimensioned so that the adjacent or opposed surfaces of the bottom and side rolls are tangent to a vertical plane passing through the apex of the angle formed by the base beam flanges. The resultant proximity of the rolls in the horizontal plane reduces the torsional moment arm of the rolls and hence reduces torsional loading of the base beam in response to loading of the conveyor belt, as compared to the aforesaid prior "Stringerflex" construction wherein the opposed roll surfaces were spaced from the plane.

Trough conveyors of the present invention are commonly installed along the subterranean galleries of mines for conveying mined material from a zone within the mine gallery to a collection depot outside of the mine. At times the receiving end of the conveyor system is lengthened in order to approach the active mining site as mining operations proceed.

Such installations impose difficult conditions on those workmen responsible for setting up and maintaining the conveyor. The mine gallery is often poorly illuminated and its floor is usually irregular and cluttered. If the parts required for the assembly of the conveyor are dropped, retrieval is difficult. Conveyor assembly procedures which require precise part alignment, the selection and assembly of various fasteners, the selection and use of a correct tool from a set of tools, etc., are difficult and time consuming operations.

The troughing conveyor of the present invention can be assembled and extended, as required, under the above-mentioned unfavorable conditions while minimizing or eliminating the various problems mentioned above. The advantages of the conveyor of the present invention are also of importance in installations other than those at mine sites, particularly where the conveyors convey material over long distances.

Under the present invention, cooperating conveyor unit attachment members are joined by wedges which wedges are initially installed at the manufacturing plant. The initial installation of the wedges requires no more than a large pair of pliers or the like. The on site, final assembly of the conveyor unit attachment members requires no more than a hammer. No small conveyor part fasteners can be dropped or lost. The final assembly, even though extendable in a mine gallery, will withstand rough handling and will remain intact under severe and continuous service.

The above mentioned and other advantages that are made possible by the use of improved universal, press-sembled locking wedge fasteners and saddle mounting members or brackets. The wedges are elongate tapered units having side flanges joined by an externally convex crown portion along their length and having free wedging edges. The wedge side flanges slidably fit into corresponding outer and inner apertures in brackets or saddles attached to one of the conveyor units to be mounted. Each wedge is loosely preassembled at the manufacturing plant with a companion conveyor unit, merely by using a pair of pliers. Once assembled, although the wedge is loose, it cannot fall out of a companion saddle or bracket.

At the conveyor unit assembly site, the bracket or saddle part of each wedge carrying unit of the conveyor is firmly but detachably connected to a mounting member or a bracket formed on a mating conveyor unit merely by driving wedges home with a hammer.

In the preferred embodiment of the invention, the improved wedges are formed as generally U-shaped section, sheet metal stampings thereby providing a relatively rigid, flanged wedge configuration. The flanges are integral with and joined by an outwardly convex crown portion, preferably generally semi-circular in section, to form the aforesaid generally U-shaped section. The crown portion forms are wedging surface. The opposed wedge side flanges are substantially parallel to one another, the wedge effect being obtained by gradually changing the depth of each wedge as measured from the apex of the crown portion to the free edges of the wedge side flanges, which edges provide the other wedging surfaces. This measurement progressively decreases from the outer end of the wedge to the inner end thereof. The resultant tapered wedge is self-locking, a typical taper being in the order of 5°.

Reference has been made to the self-retaining mounting of the wedges on their respective conveyor units for on-site assembly of the units with the brackets of companion conveyor units. After the wedges have been formed as tapered, generally U-shaped structure (as by a sheet metal stamping operation). The inner and outer end corners of each wedge side flange are bent diagonally outwardly to form small, laterally projecting tabs. The width of each wedge across the outer edges of the tabs is greater than the width of the aligned wedge-receiving apertures formed in the wedge mounting brackets or saddles, measure across the sidewalls of the apertures. The wedges are inserted through one of the wedge-receiving apertures formed in their mounting saddle flanges, preferably the aperture in the outer flange. The wedge flanges are sprung together at an opposed pair of tabs with pliers or the like. The wedge flanges are thus temporarily brought together sufficiently to cause the width of a leading end of the wedge, measured across its opposite tabs, to be no greater than the width of an outer saddle or bracket aperture through which that end of the wedge must pass. After insertion, the wedge flanges are released, whereupon they spring back to their normal shape. The tabs at both ends will now loosely retain the wedges in the outer wedge-receiving apertures of their associated saddles or brackets.

The wedge side flanges slidably but closely fit the sidewalls of both the outer and inner wedge-receiving apertures, thereby precluding lateral cocking of the wedges and insuring uniform and equal wedge engagement between upper and lower edges of the wedge-receiving apertures or other elements and the upper and lower edges of the wedges. However, in order to clear the retaining tabs during the final assembly, without requiring any springing of the wedge side flanges, the sidewalls of the inner wedge-receiving apertures are notched to clear the tabs on the wedges.

The generally U-shaped wedge configuration of the present invention provides what is essentially a "three point" engagement between the outwardly convex crown portion of the wedge and one of the units to be joined and the engagement of the lower edges of the two wedge side flanges with the other unit. The aforesaid "three point" engagement of the wedge portions with the walls of the associated apertures in the saddles or brackets of one unit and with mounting structure of the other unit formed to engage the wedge mounted in those units, insures that the crown portion of the wedge and the lower edges of both wedge side flanges will be firmly seated. If the construction is such that the convex (preferably rounded) crown portion of the wedge which connects the side flanges engages a bar or the like attached to one of the conveyor units, a true three point mounting is provided. On the other hand, if the crown portion of the wedges engages a rounded edge of a wedge receiving aperture, then the crown portion of the wedge can rotate slightly relative to the wall of the aperture to insure that the lower edges of both wedge flanges firmly engage their associated units to provide uniform wedging action by both wedge side flanges.

Another feature of the wedge and saddle construction of the present invention resides in the fact that the construction can be employed to firmly secure the saddles and associated conveyor units, to structural shapes, to upstanding brackets, to wire cables and to supporting structural rod members. The aforesaid generally U-shaped cross sectional configuration of the wedges facilitates the attainment of precise and firm wedging engagement between the wedges and elements which include wire ropes, structural rods or the like.

Mention has been made of the use of box section structural iron members as conveyor side rails and the fact that assembling such rails with flat faces uppermost cause them to collect debris falling from the roof of a mine gallery or the like. In the present invention the side rails have a box section, preferably square, and are assembled "diagonally", that is, with two upper walls depending at angles of about 45° from a vertical plane passing through the apex of the angle formed by the junction of the walls. Thus, the upper walls of the rails form a "hip roof" and their angle with the horizontal exceeds the angle of repose of material deposited thereon, so that the material slides off.

The side rails are secured end to end to upwardly opening flanged saddles on legs or posts. The saddle flanges have aligned apertures to receive securing wedges, in the manner described. The diverging upper walls of the side rails are notched to receive the wedges and to locate the side rails lengthwise.

The manner in which the aforesaid features and the advantages of the present invention can be obtained will be apparent from the following detailed description of the preferred embodiments of the invention.

BRIEF DESCRIPTION OF THE DRAWINGS

FIG. 1 is a section through a mine gallery providing a side view of both a frame supported and wire cable supported troughed conveyor embodying the present invention.

FIG. 2 is an enlarged side view of a frame supported section of the conveyor.

FIG. 3 is a partial plan view of a frame supported section of the conveyor.

FIG. 4 is an enlarged section of the conveyor taken on line 4—4 of FIG. 2 with the conveyor belt in place.

FIG. 5 is a fragmentary perspective of the adjustable post structure, viewed as indicated on FIG. 4.

FIG. 6 is a section taken on line 6—6 of FIG. 4 showing the troughing rolls.

FIG. 7 is a perspective view of the troughing rolls viewed as indicated in FIG. 3.

FIG. 8 is an end view of a troughing roll, viewed as looking along line 8—8 of FIG. 4.

FIG. 9 is a section through the troughing roll taken on line 9—9 of FIG. 8.

FIG. 10 is a perspective showing mounting details of the frame assembly.

FIG. 11 is an enlarged fragmentary side view of the frame assembly looking along line 11—11 of FIG. 10.

FIG. 12 is a view similar to FIG. 11 but being a section taken on line 12—12 of FIG. 10.

FIG. 13 is a section through the wedge frame mounting structure taken on line 13—13 of FIG. 10.

FIG. 13A is a section similar to FIG. 13 of a saddle with a wedge mounted therein but retracted.

FIG. 14 is an end view of the smaller end of the wedge assembly looking along line 14—14 of FIG. 13.

FIG. 15 is an end view of the larger end of the wedge assembly looking along the line 15—15 of FIG. 13.

FIG. 16 is a section taken along line 16—16 of FIG. 7.

FIG. 17 is a side view of the wedge assembly of FIG. 16 looking along line 17—17 of that figure.

FIG. 18 is a section taken along the line 18—18 of FIG. 16.

FIG. 19 is a section taken along line 19—19 of FIG. 16.

FIG. 20 is a side view of the return roll mounting also seen in FIG. 10.

FIG. 21 is a fragmentary enlarged section taken along line 21—21 of FIG. 20.

FIG. 22 illustrates the mounting of the troughing rolls on a wire rope.

FIG. 23 is a perspective of the mounting of the return rolls mounted on a wire rope.

FIG. 24 is a fragmentary view looking along line 24—24 of FIG. 23.

FIG. 25 is a fragmentary perspective of a wire rope and post support mounting for the troughing rollers.

FIG. 26 is a fragmentary side view of the assembly of FIG. 25.

FIG. 26A is a section taken on line 26A—26A of FIG. 26.

FIG. 27 is a partial perspective of a chain supported frame structure for the rolls.

FIG. 28 is an enlarged fragmentary perspective of the roll mounting brackets of FIG. 27.

FIG. 29 is an enlarged section of the troughing roller mounting taken on line 29—29 of FIG. 27.

FIG. 30 is an enlarged section taken on line 30—30 of FIG. 27 showing the support for the frame.

FIG. 31 is a fragmentary perspective showing the claim receiving aperture.

DESCRIPTION OF PREFERRED EMBODIMENTS

General Arrangement

The diagram of FIG. 1 is a section through a length of a mine gallery G containing the troughed belt conveyor C of the present invention. The conveyor includes an endless conveyor belt B, the upper reach 10 of which is troughed and the lower return reach 12 of which is flat. Two types of roll support structures for the belt are shown. These comprise an assembled frame support structure F and a wire rope support structure R supporting the rolls on wire ropes WR. Both support structures mount upper troughing roll assemblies TR for supporting the troughed upper reach 10 of the belt B. They also mount return roll assemblies RR for supporting the flat return reach 12 of the conveyor belt B.

Frame Assembly

Details of the frame support structure F appear in FIGS. 2-5. The frame structure is finally assembled in the gallery G and it can be lengthened toward the mining site (indicated by an arrow in FIG. 1), as required. The frame structure F includes longitudinall spaced, box section legs or posts 16 joined by box section cross bars 18. These joints are completed by the use of wedges W in a manner to be described presently.

Referring to FIG. 5, the lower end of each leg or post 16 mounts a telescoping adjustable foot 20 which is retained in its adjusted position by manually releasable, self gripping spring clip 22. This construction accommodates irregularities in the gallery floor.

A section of the frame F is completed by securing upper horizontal rails 24 to the leg and cross bar units 16, 18 using the wedges W. Each pair of opposed horizontal rails 24 mounts two troughing roll assemblies TR and one return roll assembly RR in a manner to be described presently. The spacing between a troughing roll assembly TR and an adjacent set of legs or posts 16 equals one-half of the spacing of the troughing roll assemblies along their rails 24. In this manner, the troughing rolls TR are equally spaced along the entire frame section of the conveyor.

Wedge Assembly Of Frame Structure

The wedge assembly of the frame structure F is shown in detail in FIGS. 10-15. The upper end of each post or leg 16 is welded to a generally U-shaped, upwardly opening saddle 30. Each saddle projects from each side of its associated post 16 for receiving the ends of co-linear side rails 24. As best seen in FIG. 13, the saddles 30 are formed with elongate V-shaped sockets 32 for receiving the lower wall portions of the ends of the box section rails 24. Thus, the upper walls of the side rails 24 are at an angle of 45° with horizontal and hence form a "hip roof" structure for shedding debris that drops on the rails from above. The upper walls form an angle with the horizontal and exceeds the angle of repose of granular material that might fall on the walls. Outer and inner wedge mounting flanges 34 and 36 project upwardly from the V-shaped socket 32 that receives the rails. There is some clearance between the lateral corners of rails 24 and the saddle flanges 34,36. As best seen in FIG. 11, the end portions of each side rail 24 are notched at 38 to receive wedges W upon final assembly (FIGS. 12 and 13).

The outer saddle flange 34 has formed therein two wedge-receiving, oval shaped apertures 34a each of which receives and retains a wedge W. The apertures 34a have parallel sidewalls 35 joined by an upper and lower curved wall (FIG. 12). The opposed, inner saddle flange 36 has similar aligned wedge-receiving apertures 36a, but these apertures are formed with lower, lateral notches 37 for clearing the introduction of tabs formed on the wedges W, as the latter are inserted in the assembly. Each aperture 36a has an upper curved wall and a lower flat wall (FIG. 11).

The wedges W are seen in perspective in FIG. 10. Other figures, such as FIGS. 13-15, show them in side and end elevations. The wedges are formed as U-section channels tapered along their length. Each wedge has opposed side flanges 40 having free edges 41 along one side, the other sides being joined by an externally convex crown 42, preferably rounded. The side flanges 40 are gently tapered along their length so that the free edges 41 of the side flanges form a shallow angle of about five degrees with the outermost edge portion of the crown 42. The wedges can be characterized as being "longitudinally tapered".

The wedges W are retained in their respective saddles by projections at each end. The free end corners of wedge flanges 40 are bent out slightly to form retainer projections or tabs 44 at the smaller end of the wedge and retainer projections or tabs 46 at the larger end. The sidewalls of the apertures 34a in saddle flange 34 and the sidewalls of apertures 36a in saddle 36 are spaced sufficiently to slidably receive the wedge flanges 40. Also, the notches 37 at the apertures 36a (FIGS. 11 and 14) enlarge the lower ends of the apertures 36a sufficiently to accommodate passage of the tabs 44 at the smaller end of a wedge. However, although the side walls 35 of the apertures 34a (FIG. 12) in the saddle flanges 34 will slidably receive the side flanges 40 of a wedge (FIG. 15), these walls are not spaced sufficiently to clear the web tabs 44 and 46. Thus, as seen in FIG. 13A, when a wedge W is fitted in place in a saddle 30, it cannot fall out of the saddle, even when the wedge is pulled back as far as possible for assembly of rails 24 with the saddles 30. The advantages of this feature, particularly in a difficult environment such as a mine gallery, were explained in the opening remarks.

The wedges are readily inserted to the apertures 34a in the saddle flanges 34 by temporarily springing the wedge flanges 40 together at the tabs 44 until the tabs clear the sidewalls 35 of the apertures 34a. This operation is performed by a large pair of pliers, such as vise-grip pliers. After the aforesaid initial insertion of the wedge through an aperture 34a, the tabs 44 at the smaller end of the wedge will spring back to their normal spacing, but the tabs 44 can be pushed through the apertures 36a in the opposite saddle flange 36, because of the clearance provided by the aperture notches 37 (FIG. 14). The wedges can be characterized as being "resiliently deformable".

When frame parts, such as side rails 24 and a post or leg 16 (FIGS. 10-15) are to be assembled with the post, the wedges are pulled back as seen in FIG. 13A and the opposed ends of the side rails are initially dropped into a post saddle 30. The notches 38 formed in the side rails 24 are aligned with the adjacent saddle apertures 34a and 36a. When the associated wedges W are withdrawn so that the smaller ends of the wedges formed with tabs 44 are disposed at the saddle side flanges 34, the aforesaid initial insertion of the rails into the saddles 30 can be accomplished without interference from the wedges.

The wedges are then pushed lengthwise through the notches 38 in the rails 24 and through the notched apertures 36a in the saddle flanges 36. The large end of each web is then struck with a hammer, driving the wedge home and firmly joining the associated units.

The wedging force, in the frame assembly being described, is exerted between the rounded upper walls of the saddle side flange apertures 34a, 36a, which are engaged by the rounded wedge crown 42 and the bottom walls of the side rail notches 38, which are engaged by the lower edges of the wedge side flanges 40. The side rails 24 and the posts 16 are thus quickly and firmly assembly by a simple hammering operation. The crown and flange wedge construction provides, in effect, a "three point" contact between the wedge and associated members. This insures that the lower edges of both wedge flanges 40 will firmly engage the associated wedge-receiving aperture walls.

As seen in FIG. 10, the cross bars 18 are joined to their posts 16 in a similar manner. Here saddles 50, having side flanges 52 and 54, are welded to posts 16. Each saddle flange has a pair of opposed wedge-receiving apertures 34a, 36a like those provided in the saddles 30. The cross bar 18 is notched at 48, in the manner of notches 38 formed in the side rails (FIGS. 11 and 12). Wedges W are partially withdrawn, as described, and the ends of cross bars 18 are placed in associated saddles 50. The wedges 50 are then slid through the cross rail notch 48 and through the aperture 36a in the saddle side flange 54, which aperture is notched to receive the wedge tabs 44 as is the apertures 36a shown in FIG. 11. The wedge W is then driven home by a hammer to firmly connect the cross bar 18 with their respective legs or posts 16.

Troughing Roll Construction

As previously mentioned, the troughing roll assembly TR is constructed so that the bottom or center roll is longitudinally offset from the angled side rolls and the adjacent ends of the center and side rolls overlap to eliminate any substantial lateral gap in the belt supporting surfaces provided by the rolls. In addition, both the center and the angled side or troughing rolls are mounted on a single base beam. Details of the roll mounting geometry and their mounting on the base beam are best seen in FIGS. 3, 4, 6 and 7. Referring to these figures, each troughing roll assembly TR includes a bottom or center roll 60 and angled side rolls 62. In the embodiment shown, the side rolls 62 are identical and hence have been given identical reference numbers. In the form shown, the bottom roll 60 has the same length as that of the side rolls 62. All three rolls are rotatably supported on a single base beam 64 which is mounted on and spans the side rails 24 in the frame construction F, previously described. In each troughing roll assembly TR, the bottom roll 60 is longitudinally offset from the side rolls 62.

As seen in FIGS. 4 and 7, the base beam 64 has a straight laterally extending center portion 66 joined straight, bent up side portions 68. As best seen in the section of FIG. 6, the base beam 64 has downwardly diverging flanges 70 and 72. The flange 70 mounts the center roll 60 along the horizontal center portion 66 of the base beam 64. The flange 72 mounts the two angled side rolls 62 along the angled side portions 68 of the base beam 64. Downwardly bent reinforcing flanges 70a and 72a increase the torsional rigidity and the resistance to bending of the base beam.

The center roll 60 is mounted on spaced brackets 74 welded to and projecting up from the base beam flange 70. The upper ends of these brackets 74 are notched at 76 (FIGS. 6 and 7) to receive a grooved nut 78. Each nut 78 retains the inner race of a roll mounting bearing on a roll mounting shaft in a manner not shown but known in the art. The nuts 78 are grooved to fit into the notches 76 formed in the brackets 74.

The angled side rolls 62 are similarly mounted, except that in the form illustrated they are retained by outer spring clips. The side rolls 62 are mounted on brackets 74a welded to and projecting up from the base beam flange 72. The upper ends of the bracket 74a are notched at 76a (FIGS. 8 and 9) to enter grooves 77 in nuts 78a for the side rolls 62. The grooves 77 in a nut 78a appear in FIGS. 8 and 9 and similar grooves are formed in the nuts 78 for the center rolls 60.

In the embodiment illustrated (FIGS. 8 and 9) nuts 78a of the side rolls 62 are retained in the notch 76a of their respective brackets 74a by manually deflectable spring retainer clips 80. The lower ends of the clips are screwed to the brackets 74a at 82. Each clip 80 is formed with an enlarged cutout 84 that clears the hexagonal head of the associated nut 78a. However, the upper end of each clip is formed with a narrow notch 86 (FIG. 8), the width of which is less than the diameter of nut 78a at the bottom of its groove 77.

With this construction, the shank of nut 78a formed by the groove 77 cannot slide out of the notch 76a in the mounting bracket 74a, because the nut 78a will not pass through the notch 86 in the retainer clip 80. However, if it is desired to remove a roll 62, the upper end of its retainer clip 80 is pulled or pried outwardly until the clip clears the head of nut 78a, thus permitting removal of the roll. As best seen in FIG. 9, the clip 80 is bent to form a re-curved section 88, which facilitates manual deflection of the clip for mounting and removing a roll.

One or more retainer clips 80 can also be attached to the bracket 74 for the retaining of the nuts 78 of the center roll 60, if required.

Troughing Roll Base Beam Mounting

Along the portion of the conveyor C wherein the troughing rolls are mounted on the frame structure F, the base beams 64 that support the troughing rolls TR are mounted by wedges W along the side rails 24, in a manner like that described in connection with the assembly of side rails 24 with the posts 16. The aforesaid mounting of a base beam 64 is best seen in FIGS. 7 and 16-19. As best seen in FIG. 7, in order to mount the base beam 64 on the side rails 24, the outer end of each base beam is welded to a short, depending channel-shaped post 90, the lower end of which is welded to a downwardly opening saddle 92. Referring to FIGS. 16-19, the saddles 92 are formed with diverging outer and inner flanges 94, 96 joined by a flat upper flange 98. The saddle flange 94 of saddle 92 has a wedge-receiving aperture 34b formed in the manner of apertures 34a in the saddles 30, previously described, except that the bottom wall of the apertures 34b are flat instead of rounded. The opposed saddle flanges 96 of saddle 92 has a notched wedge-receiving aperture 36b like the apertures 36a in the saddle 32.

The wedges W are formed like those previously described and have bent out tabs 44, 46 as before. A wedge is inserted through an aperture 34b in outer saddle flange 94 by springing the wedge flanges 40 together with a tool so that a pair of flange tabs, suh as tabs 44, can initially pass through the saddle aperture 34b. Upon release of the tool, the wedge will be retained in its associated saddle 92 by either set of the aforesaid tabs 44, 46.

Referring to FIGS. 16-19, the base beam saddles 92 are secured by the wedges W to brackets 100 that are welded to and project up from the side rails 24. The brackets 100 are of an inverted U-shaped with respective outer and inner flanges 102, 104 having wedge apertures 103 and 105, respectively. As best seen in FIG. 16, the bracket flanges 102, 104 are welded to the side rails 24. In order to slidably engage the crown 42 of an associated wedge W, each bracket 100 has a bar 106 welded to the inside faces of the bracket flanges 102, 104 along their upper junction (FIGS. 16, 18 and 19).

Referring principally to FIG. 16, in order to mount a base beam saddle 92 on a side rail bracket 100, the associated wedge W is first withdrawn to the left, in aperture 34b, as viewed in FIG. 13A, until the smaller end of the wedge, bearing tabs 44 is adjacent the saddle flange 94. The base beam saddle 92 can now be fitted over the side rail bracket 100, with the upper flange 98 of the base beam saddle 92 resting on the upper end of the side rail bracket 100. The opposite base beam saddle 92 is mounted on the opposite side rail bracket 100 at the same time.

The base beam saddle wedges W are now slid through bracket apertures 103 and 105 and through the notched saddle apertures 36b and driven into wedging engagement with the parts by a hammer. The crown 42 of a wedge engages the lower side of the bar 106 in the associated side rail bracket 100. Simultaneously, the lower edges 41 of wedge side flanges 40 slidably engage the bottom walls of base beam saddle apertures 34b, 36b. The resultant wedging action pulls the upper flange 98 of the base beam saddle 92 firmly down against the upper side of the associated side rail bracket 100.

Since the side flanges 40 of each wedge slidingly engage the sidewalls of both wedge-receiving apertures 34b and 36b in this and in all embodiments of the invention, the wedge cannot become laterally cocked before it is hammered home. Thus, the lower edges 41 of both wedge flanges 40 engage the flat lower walls of associated wedge-receiving apertures 34b and 36b with equal force.

Troughing Roll Geometry

As previously mentioned, localized wear and damage to the loaded reach 10 of the conveyor belt B is minimized by longitudinally offsetting the center roll 60 and the angled side roll 62. This makes it possible for the adjacent upper end portions of these rolls to laterally overlap, so that the troughing rolls TR ride a substantially laterally continuous belt supporting surface. The troughing roll geometry of a troughing roll assembly TR of the present invention is best seen in FIGS. 3, 4, 6 and 7.

Referring first to FIG. 6, the angle "b" between the base flanges 70 and 72 of the base beam 64; the height of the roll mounting bracket 74 and the roll diameter are carefully chosen so that a vertical plane y—y passing through the junction of the base beam flanges 70, 72 is tangent to the opposed, facing surfaces of center roll 60 and of side rolls 62. This tangency minimizes the amount of longitudinal offset of the center rolls 60 and the side rolls 62 with a given set of troughing rolls TR, and hence minimizes the torsional moment arm loading of the base in response to the weight of materials being conveyed by the belt.

Referring to FIG. 4, because of the aforesaid longitudinal roll offset, the adjacent upper end portions of the center roll 60 and of the side rolls 62 are laterally overlapped, thereby providing the aforesaid substantially laterally continuous support for the conveyor belt B. In FIG. 4 it can be seen that a plane e—e that is tangent to one end of a center roll 60 intersects a plane f—f tangent to the adjacent end of a side roll 62. The intersection of these planes is along a line x which is below the uppermost surfaces of the rolls 60,62. A similar intersection line x is formed at the other end of center roll 60. This roll geometry, made possible by the longitudinal offset of the rolls, causes the adjacent upper end portions of rolls 60 and 62 to overlap. The resultant laterally continuous roll support surface for the belt B provided by each set of troughing rolls TR is apparent in FIG. 4, and this desirable result is obtained even though all the rolls of the set of troughing rolls are mounted on a single, rigid base beam 64.

As shown in FIG. 4, the preferred angle "a" between the lower section 66 of the base beam 64 and the side section 68 is an angle of about 35 degrees. As illustrated in FIG. 6, the preferred included angle "b" between the base flanges 70 and 72 of the base beam 64 is an angle of about 120 degrees.

Return Roll Mounting

Details of the mounting of the belt return rolls RR on the frame structure F are not critical to the invention but are shown in FIGS. 1, 2, 10, 20 and 21. Laterally opposed, depending return roll support brackets 110 are welded to the undersides of the side rails 24 of the frame F. As seen in FIGS. 1 and 2, opposed brackets 110 are welded to the rails 24 adjacent a set of legs or posts 16.

The brackets 110 are cut out at 112 (FIGS. 10, 20 and 21) to provide curved load bearing tongues 114. The lower edge of the flanges formed by the tongues 114 are notched at 116. The return rolls RR are hung by brackets 120 which have re-curved upper end flanges 122. A tongue 124 is bent in from the lower portion of flange 122 and fits into a notch 116 formed in the associated bracket 110. The tongue prevents axial shifting of the hanger brackets 120 along the side rail brackets 110.

As seen in FIG. 20, the brackets 120 have an upper notch 126 which is wide enough to receive grooved nuts 78b for the shafts of the return rolls RR. The upper notch 126 joins a narrower notch 128 formed in bracket 120 with the narrow notch receiving a grooved portion of the associated nut 78b. This condition resembles that previously described in connection with FIGS. 8 and 9 wherein the notch 76a receives a grooved portion 77 of a roller shaft nut 78a.

Wire Cable Mounting Of Troughing Rolls

As seen at the right of FIG. 1, along one section of the conveyor, the troughing rolls TR are supported by taut, laterally spaced wire cables WR. Only one cable appears in the side view of FIG. 1. Some of the troughing rolls are supported on the wire cable above legs or posts 16a and others are supported on suspended portions of the wire cables disposed between the legs 16a.

The suspension of the troughing rolls TR on the wire rope or cable WR between the legs 16a is shown in FIG. 25. The rolls 60 and 62 are rotatably mounted on the base beam 64 in the manner previously described. The ends of each base beam are supported by saddles 92 and posts 90, also as previously described. The saddles 92 have opposed, flat bottom wedge receiving apertures for the wedges W like the apertures 34b, 36b described previously. When the wedges W are hammered home, they clamp the wire rope WR between the crowns 42 of the wedges and the upper flanges 98 of the associated saddle 92. The lower edges 41 of wedge flanges 40 tightly engage the flat lower walls of saddle apertures in saddle flanges 94, 96 as described in connection with the construction of FIGS. 16-19.

Wire Cable Mounting Of Return Rolls

As seen at the right of FIG. 1, all of the return rollers RR are mounted on suspended lengths of the wire cable WR. Referring to FIGS. 23 and 24, the rolls RR are suspended on the wire cables WR by brackets 120a each having a long inner flange 121 which is bent over to provide a narrow upper flange 130 and a short depending outer flange 132. Opposed wedge-receiving apertures 34c and 36c are formed in the opposed flanges 132 and 121, respectively, these apertures having flat bottom edges like those of apertures 34b and 36b. When a wedge W is hammered home, the wire rope WR is clamped between the crown 42 of the wedge and the lower side of the narrow upper flange 130 of the suspending bracket 120. The lower edges 41 of the wedge flanges 40 engage the flat lower edges of bracket apertures 34c and 36c.

The nuts 78b for the ends of return rolls RR are mounted in brackets 120a by keyhole slots having wide and narrow portions 126a and 128a, as previously described in connection with the construction of FIG. 20.

Wire Cable Mounting Of Troughing Rolls At Posts

As seen in FIGS. 1, 25 and 26, some of the troughing rolls TR are mounted on wire cables WR at the location of cable support posts 16a. The wedge mounting of the troughing roll saddles 92 on the wire cables WR is like that described in connection with FIG. 22, as well as like the mounting of the return rolls RR on the wire cable WR in FIGS. 23 and 24. However, the mounting structure at the post 16a has additional features for guiding the wire cables and for stabilizing the cables and the posts. Hence, only the aforesaid additional structure will be described in connection with FIGS. 25 and 26.

Welded to the upper end of each post 16a is a cable supporting and guiding bracket 140. The bracket 140 has an angled base flange 142 welded to the upper end of post 16a and an upstanding cable guide box 144 is formed by welding pieces to the base flange 142. The box 144 has end flanges 146 that are notched at 148 for receiving the wire cable WR. The box 144 also has a narrow outer flange 150 that is notched to clear the wedge W, including its lower edges. An inner flange 152 of the box is offset inwardly, as seen in FIG. 26, to clear the depending posts 90 that mounts the roll saddle 92. The inner flange 152 is also apertured to receive the wedge W. When in wedging engagement with the parts, the crown portion 42 of the wedge makes essentially a single point engagement with the wire cable WR and the lower edges of the side flanges 40 of the wedge W both firmly engage the flat lower edges of the wedge receiving apertures 34d and 36d formed in the saddle 92 that mount the troughing rollers.

In order to stabilize post 16a, a horizontal stabilizer arm 154 has its outer end welded to the box 144. The stabilizer arm 154 may have the same crosssection as that of a base beam 64, but the inner end of arm 154 is partially cut away to provide a tongue 156. The tongue 156 is slid into an opening formed by a short base beam plate 158 that is welded at each end to the narrow flanges 70a and 72a of the base beam 64.

Wire Cable Supported Side Rail Conveyor

FIGS. 27, 30 and 31 show a conveyor assembly wherein the rolls are mounted on side rails and the latter are suspended by chains. The upper ends of the chains are attached to the roof of a mine gallery or to framework, the details of which are not critical to the present invention.

The frame F2 has box-section side rails 24a having a different cross-sectional shape than that of the side rails 24 previously described in connection with FIGS. 1-4, 7 and 10-13. As best seen in FIGS. 29 and 30, the side rails 24a have a flat bottom wall 160, a wide vertical inner wall 162, a rounded upper edge wall 164, a steeply inclined upper outer wall 166 and a narrow outer vertical wall 167 joining the bottom wall 160 and the inclined upper wall 166. These rails will also shed debris that falls thereon as described in connection with the description of side rails 24. The inclined wall 166 is inclined to the horizontal at an angle that exceeds the angle of repose of debris that might fall thereon. The rounded narrow upper wall 164 will collect little or no debris and the vertical walls 162 and 167 will not collect debris. Thus, the side rails 24a will not collect falling debris.

The ends of adjacent rails 24a are mounted in and supported by chain-suspended brackets 168 (FIGS. 27 and 31). The brackets 168 have an inverted, generally U-shaped section formed by a flat bottom flange 170, a wide inner side flange 172 and a narrower outer side flange 174. The bottom wall and side flanges of brackets 168 receive the side rails 24a. In order to maintain the lateral spacing of side rails 24a on opposite sides of the conveyor and in order to locate the ends of the side rails, the chain-suspended brackets 168 are welded to the ends of channel shaped cross bars 176 (FIGS. 27 and 30). Each bracket and cross bar unit has two side rail locating pins welded thereto. One pin 178 at each bracket 168 fits into an aperture formed in the bottom flange 160 of a side rail 24a, adjacent the associated end of the rail. The side rails 24a are thus positively held in the desired laterally spaced relationship and are positively positioned lengthwise.

As seen in FIGS. 27 and 30, the side rails 24a and the troughing and return rolls TR,RR are suspended by opposed links of chains L. The end of chains L are slid through the rail support brackets 168 by passing each link through a keyhole aperture 180 formed in the bracket 168 and partially in the cross bar 176 (FIG. 31). The keyhole aperture 180 has an enlarged, lower chain-clearing portion 182 formed in cross bar 176 and in the bottom flange 170 of the bracket 168. The enlarged aperture portion 182 joins a vertical slot 184 largely formed in the outer wall 174 of the suspending bracket 168. The slot 184 has a width that is just slightly greater than the thickness of a chain link.

In mounting a cross bar 176 and attached brackets 168 on suspending chain links L, the chain links are passed through the enlarged aperture portions 182 in the brackets and in the cross bar. The brackets are held at the desired height and one chain link 190 (FIG. 30) is then slid into the slot 184, causing the next lower link 192 to be restrained by the outer wall 174 of the bracket 168. The upper link 190 cannot pull the lower link 192 through the narrow slot 184, which causes the chain L to firmly support the bracket and the cross bar. The pins 178 and their mating apertures in the bottom flange 160 of the side rails 24a are so positioned that when the ends of the side rails are slipped into the chain-supported brackets 168 and over the pins 178, the extreme adjacent ends of the side rails clear and straddle the chains L.

Troughing Roll Mounting

Referring to FIGS. 27-29, the roll mounting structure used in the framework that employs side rails 24a is substantially the same as the roll mounting structure for wire cables described in connection with FIGS. 22, 25 and 26 for the troughing rolls TR and in FIGS. 23 and 24 for the return rolls RR.

Referring to FIGS. 27-29, the inner side flange 162, the outer inclined flange and the rounded upper wall 164,166 of the side rails 24a are cut out to provide an elongate notch in the rail having lower edges 194,196. A bar 200 extends along the upper sides of the notch for mounting the roll sets. The ends of bar 200 are welded to the side walls of the notch so that the bar provides a smooth continuation of the rounded upper wall 164 of the side rail 24a.

Each depending end post 90 of a troughing roll saddle beam 64 is welded to an inverted U-shaped saddle 92, like the saddles 92 previously described. At the manufacturing plant, a wedge W, having inner tabs 44 and outer tabs 46 is inserted through the outer wedge-receiving openings 34e in the saddle. This is accomplished by temporarily springing the web flanges 40 together with pliers so that the tabs 44 clear the walls of the outer apertures 34e, as previously described. The inner saddle apertures 36e (FIG. 29) are formed with lower tab clearing notches (not shown), such as notches 37 shown in FIGS. 14, 18 and 19.

During assembly, the previously assembled wedges in the saddles 92 are withdrawn, as shown in FIG. 13A, and the saddles 92 are set down on the side rail bars 200. The diverging sidewall 94 of the saddles clears the side rail flange 166 (FIG. 29) sufficient to accommodate the initially retracted wedge during the setdown operation. The wedges W are fully inserted and hammered home, thereby securing the troughing rolls TR to the side rails 24a.

Return Roll Mounting

The brackets 120a for the return rolls RR (FIGS. 27 and 28) are mounted on the side rods 200 in a similar manner, and as previously described in connection with the wire cable mounting of FIGS. 23 and 24. In both of the wedge assemblies just described a self-aligning "three point" mounting of the wedges is provided.

Having completed a detailed description of several embodiments of the invention it would seem that the troughing roll conveyor of the present invention reduces wear and damage to the underside of the trough belt and can be readily assembled under difficult conditions by a single tool, namely, a hammer, and that parts required for assembly cannot be lost.

Having completed a detailed description of several embodiments of the invention so that those skilled in the art can practice the same, I claim:

1. A belt conveyor of the type having longitiudinal, laterally spaced side rails having upper wall portions mounted on said side rails comprising downwardly diverging walls, a transverse roll supporting base beam structure and means attached to the base beam structure including a wedge and a wedge receiving aperture for mounting said base beam structure on said upper wall portions the improvement comprising: elongate longitudianl notches in said upper wall portions of said side rails and a longitudinal round rod (200) welded to the inside of said side rails along the upper edges of the notches whereby said transverse roll supporting base beam structure is retained on said side rails by said wedge means passing through said wedge receiving apertures of said means for mounting said base beam structure and said elongate longitudinal notches in said rails.

2. The belt conveyor of claim 1; wherein the upper walls of said rails are joined by a rounded upper wall portion that forms a continuation of said rod.

3. A belt conveyor of the type having longitudinal, laterally spaced side rails, transverse roll supporting beam structure and means for mounting said beam structure on said side rails; said side rails comprising channel members having side flanges, opposed notches in said side flanges, longitudinal bars welded to said side flanges and extending along the upper sides of said notches, apertured saddles secured to said beam structure for straddling said side flanges at said bars and wedges in said saddle apertures, said wedges engaging said side flanges and said bars and the opposed walls of said saddle apertures.

4. A belt conveyor of the type having longitudinal, laterally spaced apart side rails, a transverse roll supporting base beam structure having end posts depending from end portions of said base beam structure and said end posts attached to inverted U-shaped saddles having an aperture in flanges of said saddles wherein the improvement comprises: side rail brackets projecting upwardly from said side rails, said side rail brackets formed with wedge receiving apertures, said side rail brackets further include a longitudinal round rod attached to the inside of said side rail brackets along the upper edge of said wedge receiving apertures; a wedge passing through said wedge receiving apertures and said apertures in said flanges of said saddles whereby said base beam structure is retained on said spaced apart side rails.

* * * * *